(12) United States Patent
Reyhanloo (10) Patent No.: US 8,839,711 B2
(45) Date of Patent: Sep. 23, 2014

(54) BEVERAGE PREPARATION MACHINE WITH A PINCH VALVE

(75) Inventor: Shahryar Reyhanloo, Lohn Ammansegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 873 days.

(21) Appl. No.: 12/517,510

(22) PCT Filed: Dec. 11, 2007

(86) PCT No.: PCT/CH2007/000621
§ 371 (c)(1),
(2), (4) Date: Aug. 5, 2009

(87) PCT Pub. No.: WO2008/071024
PCT Pub. Date: Jun. 19, 2008

(65) Prior Publication Data
US 2010/0064900 A1    Mar. 18, 2010

(30) Foreign Application Priority Data
Dec. 12, 2006   (CH) ........................................ 2026/06

(51) Int. Cl.
| | | |
|---|---|---|
| A47J 31/057 | (2006.01) | |
| F16K 7/04 | (2006.01) | |
| A47J 31/46 | (2006.01) | |
| F16K 11/02 | (2006.01) | |
| A47J 31/44 | (2006.01) | |

(52) U.S. Cl.
CPC ............. *A47J 31/465* (2013.01); *F16K 11/027* (2013.01); *A47J 31/4485* (2013.01)
USPC ................ 99/300; 99/323.3; 99/275; 99/280; 137/595; 251/7; 251/129.02

(58) Field of Classification Search
USPC ............... 99/300, 275, 323.3; 137/595; 251/7
See application file for complete search history.

(56) References Cited

U.S. PATENT DOCUMENTS

| | | | | |
|---|---|---|---|---|
| 2,624,364 A | * | 1/1953 | Detlefsen ...................... | 137/863 |
| 2,985,192 A | * | 5/1961 | Sinclair et al. ............. | 137/627.5 |
| 3,018,793 A | * | 1/1962 | Fridtjof ......................... | 137/595 |

(Continued)

FOREIGN PATENT DOCUMENTS

| | | |
|---|---|---|
| DE | 88 15 997.3 | 4/1990 |
| JP | 54-031381 A | 3/1979 |
| JP | 03-032612 A | 2/1991 |

OTHER PUBLICATIONS

International Search Report for International Application No. PCT/CH2007/000621.

(Continued)

*Primary Examiner* — Gene Kim
*Assistant Examiner* — Matthew B Stanczak
(74) *Attorney, Agent, or Firm* — Alston & Bird LLP (57) ABSTRACT

A beverage preparation machine has at least one pinch valve (1) in the fluid line system, wherein the pinch valve (1) has at least two fluid passage lines (20, 21) and is designed to execute valve and/or control functions on the fluid passage lines (20, 21). The operating mechanism of the pinch valve (1) is set up for coupled activation of the valve and/or control functions and a drive with a stepper motor (25) is provided.

3 Claims, 5 Drawing Sheets

Position X:

Position Z:

(56) References Cited

U.S. PATENT DOCUMENTS

| | | | |
|---|---|---|---|
| 3,075,551 A | 1/1963 | Smith et al. | |
| 3,411,534 A * | 11/1968 | Rose | 137/595 |
| 3,511,469 A * | 5/1970 | Bell | 251/7 |
| 3,517,859 A * | 6/1970 | Miller | 222/52 |
| 3,861,421 A * | 1/1975 | Thompson | 137/636.4 |
| 3,882,899 A * | 5/1975 | Ginsberg et al. | 137/627.5 |
| 3,932,065 A * | 1/1976 | Ginsberg et al. | 417/317 |
| 4,061,142 A * | 12/1977 | Tuttle | 604/34 |
| 4,071,039 A * | 1/1978 | Goof | 137/87.04 |
| 4,230,151 A * | 10/1980 | Jonsson | 137/595 |
| 4,259,985 A * | 4/1981 | Bergmann | 137/595 |
| 4,269,333 A * | 5/1981 | Nakai et al. | 222/484 |
| 4,484,599 A | 11/1984 | Hanover et al. | |
| 4,493,710 A * | 1/1985 | King et al. | 604/250 |
| 4,524,802 A * | 6/1985 | Lawrence et al. | 137/595 |
| 4,544,127 A * | 10/1985 | Szabo | 251/9 |
| 4,684,102 A * | 8/1987 | Dykstra | 251/7 |
| 4,694,861 A * | 9/1987 | Goodale et al. | 137/624.19 |
| 4,825,758 A * | 5/1989 | Snowball et al. | 99/282 |
| 4,993,456 A * | 2/1991 | Sule | 137/595 |
| 5,033,656 A * | 7/1991 | Blette et al. | 222/212 |
| 5,188,334 A * | 2/1993 | Yoshii et al. | 251/7 |
| 5,190,071 A * | 3/1993 | Sule | 137/595 |
| 5,249,706 A * | 10/1993 | Szabo | 222/20 |
| 5,549,793 A * | 8/1996 | Hellstrom et al. | 162/258 |
| 6,497,343 B1 * | 12/2002 | Teetsel, III | 222/1 |
| 6,871,660 B2 * | 3/2005 | Hampsch | 137/1 |
| 8,376,310 B2 * | 2/2013 | Veltrop et al. | 251/7 |
| 8,622,365 B2 * | 1/2014 | Fukano et al. | 251/7 |
| 2003/0234053 A1 | 12/2003 | Hampsch | |
| 2007/0228315 A1 * | 10/2007 | Miller | 251/252 |

OTHER PUBLICATIONS

International Preliminary Report on Patentability for International Application No. PCT/CH2007/000621.

* cited by examiner

Fig.1

Position X:

Fig. 2a

Position Y:

Fig. 2b

Position Z:

Fig. 5c  Alternative D

Fig. 5b  Alternative C

Fig. 5a  Alternative B

BEVERAGE PREPARATION MACHINE WITH A PINCH VALVE

BACKGROUND

1. Field of the Invention

The invention relates to a beverage preparation machine comprising at least one pinch valve in the fluid line system.

The invention relates in particular to a beverage preparation machine of the above-mentioned type, thus for example to a coffee or espresso machine, where a liquid or fluid component must be redirected to different outlets or which is also particularly suitable for preparing beverages comprising two different liquid components, such as, e.g., latte.

2. Description of Related Art

There are thus models of espresso machines, where the dispensing of coffee or cappuccino is executed via two different outlets in each case at different dispensing locations. A change-over of the dispensing path for coffee is required here.

In the case of the preparation of latte, the two liquid components are coffee and milk, which are in each case fed to a single or also to different outlets from different sources or containers. A change-over on the side of the feed line or delivery line is required here.

For this purpose, switching components comprising suitable valve and/or control functions must be present in the fluid line system of the beverage preparation machine.

The term "valve and/or control function" will be used hereinbelow with the following meaning:

Valve function is understood to be a function, in response to which a fluid passage is turned on, off or changed over.

Control function is understood to be a function, in response to which a fluid throughput quantity is reduced or increased in a controlled manner, which can obviously also include valve functions.

Known switching components in beverage preparation machines are the very frequently used magnetic valves. Magnetic valves, however, have a number of disadvantages, which are possibly undesirable. They are heavy and expensive, typically also relatively susceptible to being soiled and must furthermore be energized constantly in at least one activation position, which then also leads to an increasing heating of the electromagnets.

Pinch valves per se are also known. In some cases, they are preferred because of the much smaller susceptibility to being soiled, because the fluid medium guided in a pinchable valve does not have any contact to the valve mechanics. They are thus also suitable for the most different of fluid media and in particular also for controlling flow rates.

SUMMARY OF VARIOUS EMBODIMENTS

The object of the invention is thus to specify an improved beverage preparation machine, where at least one pinch valve provides for more versatile functions in the fluid line system with respect to the distribution and flow quantity control of the fluid media.

This object is solved by means of the features of patent claim 1.

The solution lies in that at least one pinch valve, which is arranged in the fluid line system of the beverage preparation machine, encompasses at least two fluid passage lines and is designed to execute valve and/or control functions on the fluid passage lines.

Due to the use of a pinch valve, the advantages of the pinch valve are initially transferred to the beverage preparation machine. The beverage preparation machine can be produced in a simpler and more cost-efficient manner. A pinch valve is much less susceptible to being soiled and is thus also more hygienic and activating mechanisms (which will still be referred to hereinbelow) are furthermore also possible, which use electric power only during the change-over or during the mechanical adjustment, respectively.

Due to the design with at least two fluid passage lines, manifold valve and control functions can be realized.

Advantageously, an activating mechanism is thereby present for the coupled activation of the valve and/or control functions of the two fluid passage lines. In response to turn on, turn off and switch-over operations of the fluid paths, the fluid passage quantities can be controlled in a dosed manner and according to the demands. The fluid passage quantity control can thereby be provided in the same direction (the two fluid passage lines are opened or closed simultaneously) or in opposite directions (one of the fluid passage lines is opened while the other is closed).

A change-over function (control of the fluid passage quantities in opposite directions), which is realized by means of the provided means, can also be considered to be a throttling function in opposite directions (in the two fluid passage lines). Fluid flows can thus not only be turned on to a continuously increasing extent or can be turned off to a continuously decreasing extent, but can also be changed over so as to constantly change in opposite directions.

Either a linearly operating or a rotatively operating activating mechanism comprising a stepper motor drive is used in preferred embodiments. In response to the linearly operating activating mechanism, the activating mechanism then advantageously includes one or a plurality of pinch wedges. In response to a rotatively operating activating mechanism, the activating mechanism then advantageously includes at least one eccentric disk.

The use of a stepper motor makes it possible, despite compact dimensions, to raise an activating force, which is greater as compared to electromagnets. This results in space and cost savings. Longer switching travels can be realized, whereby larger tube cross sections can be used, which, in turn, can encompass fluidic advantages. Thanks to the self-locking, suitable well-established stepper motors can furthermore be held in a dead state, even in the pinch positions. A fluid flow can thus remain changed-over for an undetermined period of time.

Overall, the valve type according to the invention cannot only be used for the redirection of coffee, but also for other fluid media, such as water, steam or milk, for example.

BRIEF DESCRIPTION OF THE SEVERAL VIEWS OF THE DRAWINGS

The invention will be specified in more detail below by means of drawings.

In the drawings

DETAILED DESCRIPTION

Figure 1:
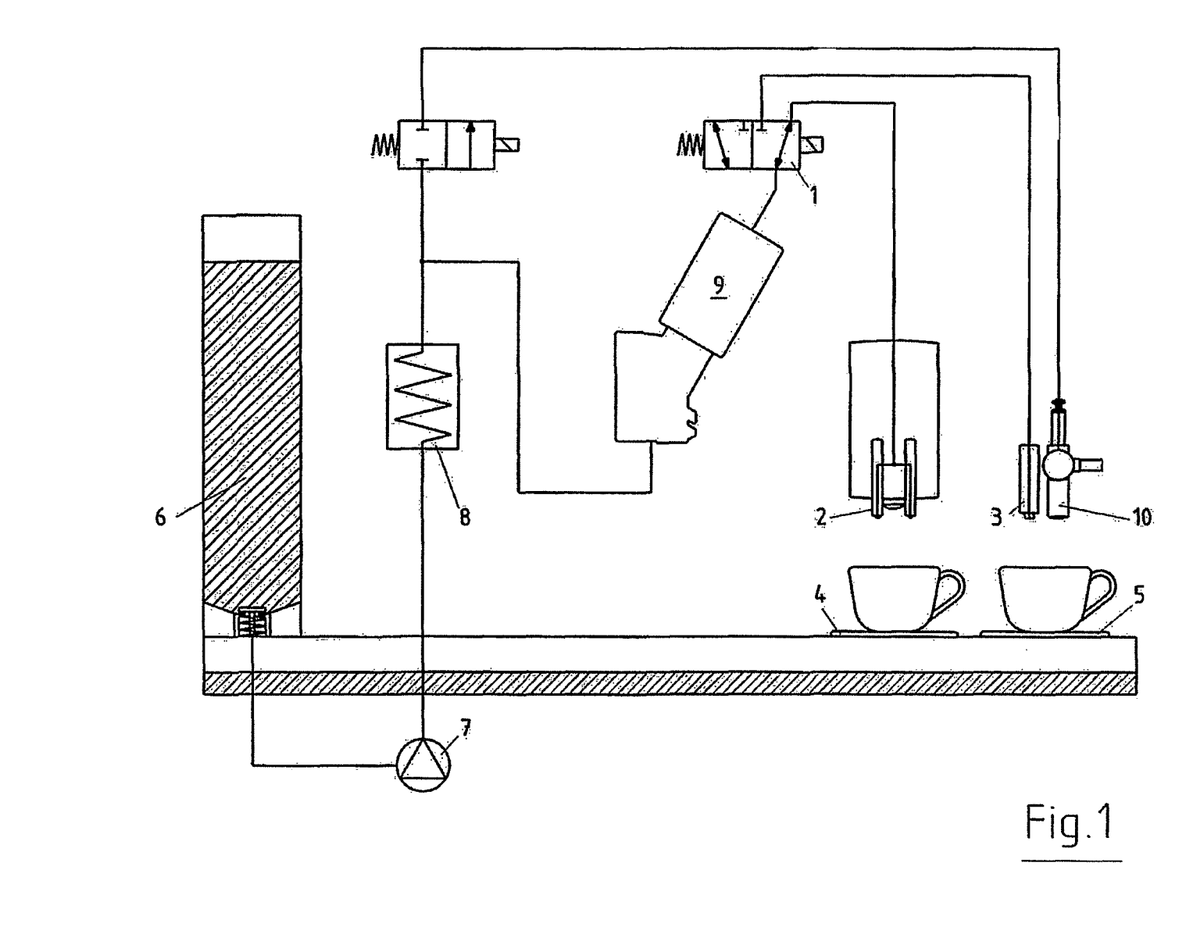
FIG. 1 shows an example of a coffee machine comprising a fluid line system comprising a pinch valve according to the invention in a schematic illustration.

FIG. 1 shows an example of a coffee machine comprising a fluid line system comprising a pinch valve 1 according to the invention in a schematic view. In the instant example, the dispensing of coffee or cappuccino is executed via respectively different outlets 2, 3 at different dispensing locations 4, 5. Depending on the selection of the beverage type (coffee or cappuccino), a change-over of the dispensing path for coffee is thus necessary.

An instantaneous water heater 8, which is fed by a water tank 6 via a pump 7, supplies hot water to a brewing unit 9 for preparing coffee. The change-over of the dispensing path for coffee is executed by means of the pinch valve 1. When a cappuccino is prepared, the instantaneous water heater is also used to generate steam for preparing the milk froth by means of a milk frother 10 after the coffee has been dispensed.

Figure 2A:
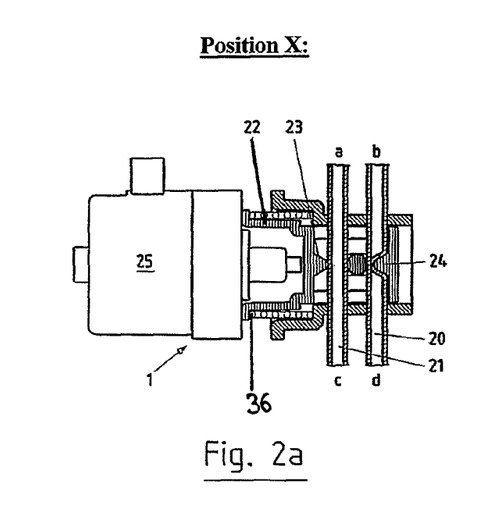
FIGS. 2a-c show a pinch valve according to the invention comprising two fluid passage lines and a linear activating mechanism in three switch-over positions (X, Y, Z)
Figure 2B:
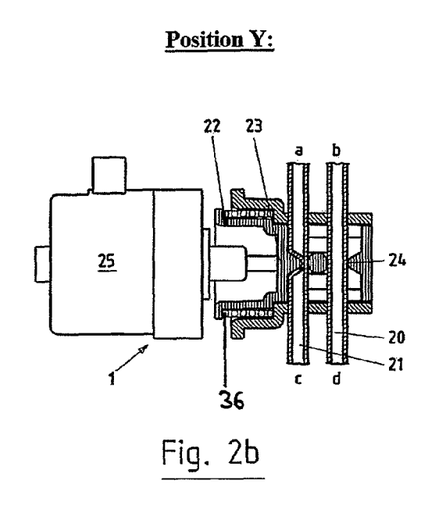
Figure 2C:
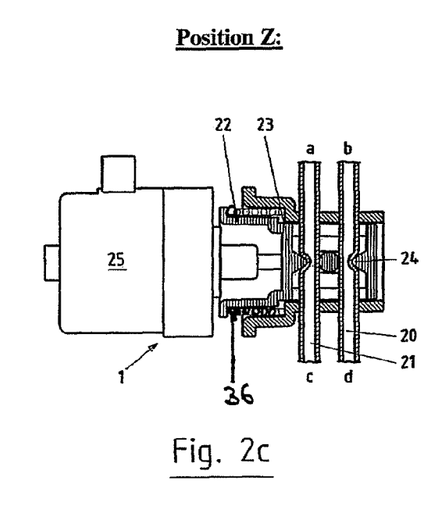

FIGS. 2a-c show a pinch valve 1 according to the invention comprising two fluid passage lines 20, 21 and a linear activating mechanism in three switch-over positions (X, Y, Z). The fluid passage lines 20, 21 are embodied as valve tubes, the inlets/outlets of which are identified with a and c or b and d, respectively. Pinch wedges 23, 24, which are attached to a valve change-over switch 22, are located on both sides of the fluid passage lines 20, 21. The valve change-over switch 22 can be linearly displaced by means of a linear motor 25. The one or the other fluid passage line 21, 20 can be pinched shut and can thus be closed by means of the pinch wedges 23, 24 due to the linear displacement of the valve change-over switch 22. See FIGS. 2a (switch-over position X/fluid passage line 20 blocked) and 2b (switch-over position Y/fluid passage line 21 blocked) with reference thereto. In addition, FIG. 2c shows a central position (switch-over position Z), in which neither the fluid passage line 20 nor the fluid passage line 21 is completely blocked. Due to the coupling of the closing mechanism in opposite directions by means of the pinch wedges 23 and 24, which is illustrated herein, the pinch valve 1 can also be used to change-over or divert a fluid flow, respectively. This use is described in detail in FIG. 4 and it also forms the basis for the schematic illustration according to FIG. 1.

Figure 3A:
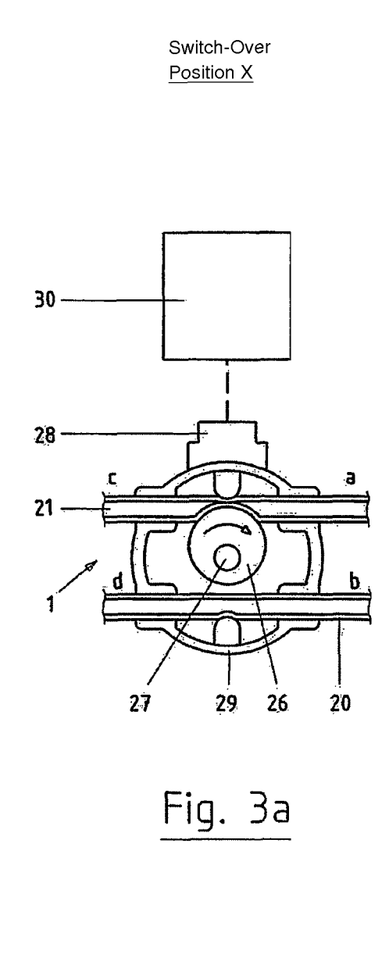
FIGS. 3a-c show an alternative embodiment of a pinch valve comprising two fluid passage lines and an eccentric activating mechanism in three switch-over positions (X, Y, Z)
Figure 3B:
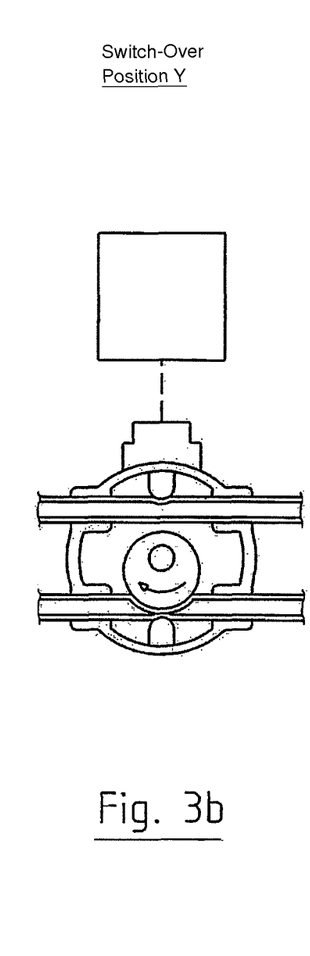
Figure 3C:
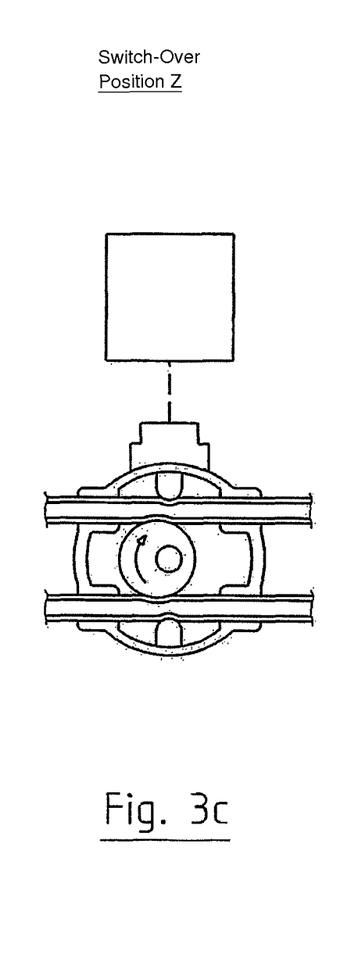

FIGS. 3a-3c show an alternative embodiment of a pinch valve comprising two fluid passage lines 20, 21 and an eccentric activating mechanism in three switch-over positions (X, Y, Z). The fluid passage lines 20, 21 are embodied as valve tubes, the inlet/outlets of which (in correspondence with FIG. 2) are identified with a and c or b and d, respectively. An eccentric disk 26, which is activated by a further stepper motor 28 via a drive axle 27, is located between the fluid passage lines 20, 21. The one or the other fluid passage line 21, 20 can be pinched shut and can thus be closed by rotating the eccentric disk 26 about the drive axle 27. See FIGS. 3a (switch-over position X/fluid passage line 21 blocked) and 2b (switch-over position Y/fluid passage line 20 blocked) with reference thereto. In addition, FIG. 3c shows a central position (switch-over position Z), in which neither the fluid passage line 20 nor the fluid passage line 21 is completely blocked. Due to the coupling of the closing mechanism in opposite directions by means of the eccentric disk 26, which is illustrated herein, the pinch valve 1 can also be used herein to change-over or divert a fluid flow, respectively. The fluid passage lines 20, 21 and the eccentric disk 26 are located in a suitably designed valve housing 29. In addition, the necessary connection to a control electronics 30 for controlling the stepper motor 28 is also shown herein.

Figure 4:
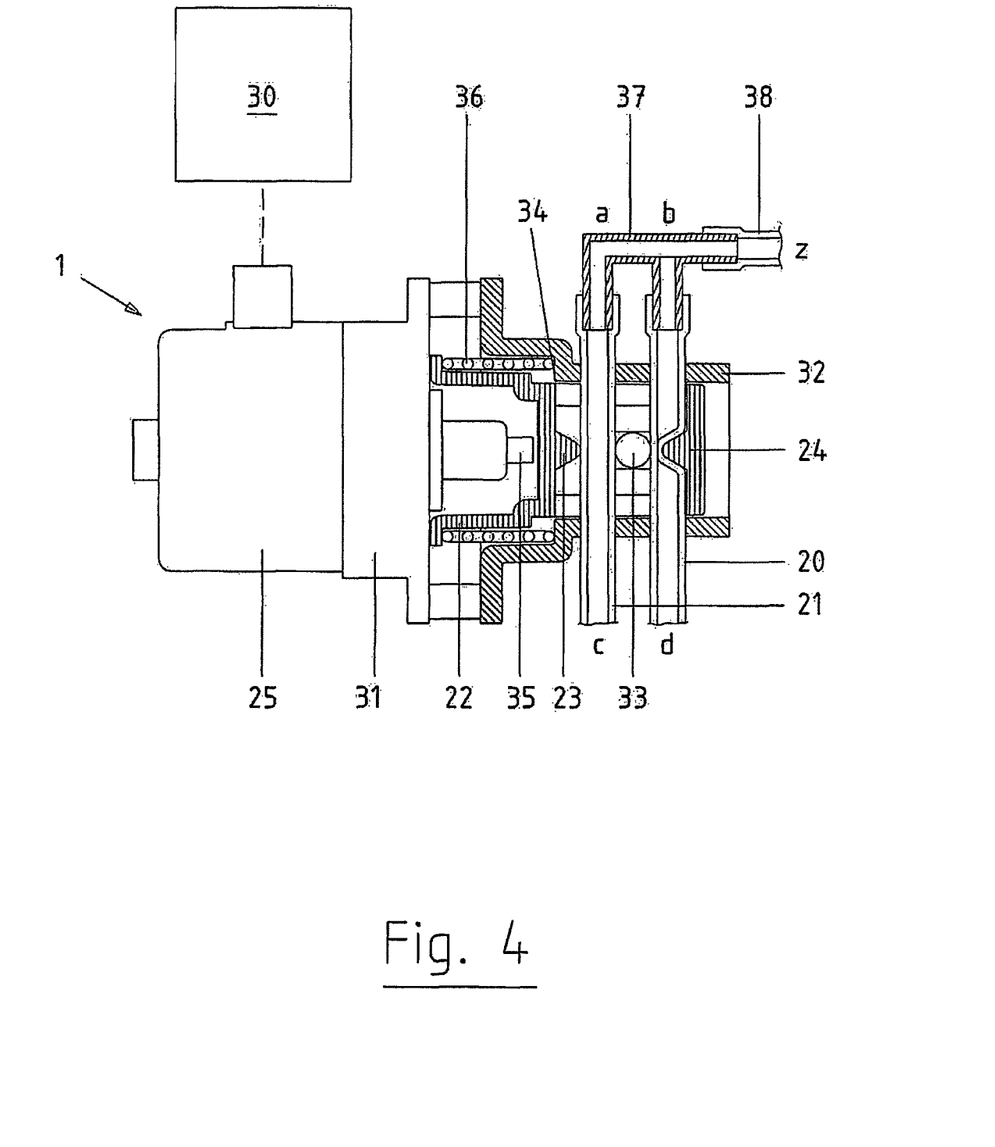
FIG. 4 shows a detailed illustration of a pinch valve according to FIG. 2 with a change-over function and a common inlet.

The switch-over positions Z according to FIGS. 2 and 3 are also suitable to relieve the valve tubes (fluid passage lines). This can be advantageous in response to a longer storage of the pinch valve 1 or of the beverage preparation machine, respectively, comprising such a pinch valve, while not being in operation. FIG. 4 shows a detailed illustration of the pinch valve 1 according to FIG. 2 with a change-over function and a common inlet Z. Some of the important components have already been presented in the description relating to FIG. 2. The following embodiments thus have a supplemental character:

The stepper motor 25 is connected to a valve housing 32 via a stepper motor flange 31. An intermediate bolt 33 is plugged in and fixed at the valve housing 32. The valve change-over switch 22 can be moved in the valve housing 32 in linear and axial direction. A radial grading in the valve housing 32 forms a valve change-over switch stop 34. The compression or pinching motion, respectively, for the fluid passage line 21 can be defined by means of the valve change-over switch stop 34 and the intermediate bolt 33 (in this case, the pinching of the valve tube takes place between the pinch wedge 23 and the intermediate bolt 33). By means of a corresponding activation of the stepper motor 25 with the control electronics 30, a lifting rod 35 can be displaced in linear and axial direction. The lifting rod 35 transfers the axial motion in response to the deployment on the valve change-over switch 22. In the home position (as is illustrated herein), the passage through the fluid passage line 20 in the direction b-d is blocked by means of the reset force of a pressure spring 36 and by means of the pinch wedge 24. To reach the end position (not illustrated), the lifting rod 35 and thus the valve change-over switch 22 with the pinch wedges 23 and 24 must thus be displaced against the force of the pressure spring 36 in axial direction (to the right) by means of the stepper motor 25, wherein the fluid passage line 21 is gradually sealed in the direction a-c and the fluid passage line 20 is opened in the direction b-d. In this example, in the inlets a, b of the fluid passage lines 21, 20 are connected to a distribution connection 37. A delivery hose 38 for the inflow Z can be fastened to the distribution connection 37.

Figure 5A:
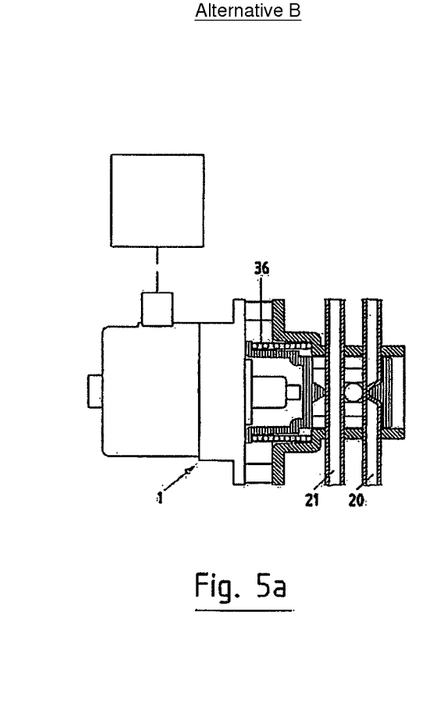
FIG. 5a-c show different structural alternatives of a pinch valve according to FIG. 4, wherein a) is a structural alternative B comprising a pressure spring and independent fluid passage lines,
b) is a structural alternative C without pressure spring and
c) is a further structural alternative D comprising a pressure spring and a plurality of fluid passage lines.
Figure 5B:
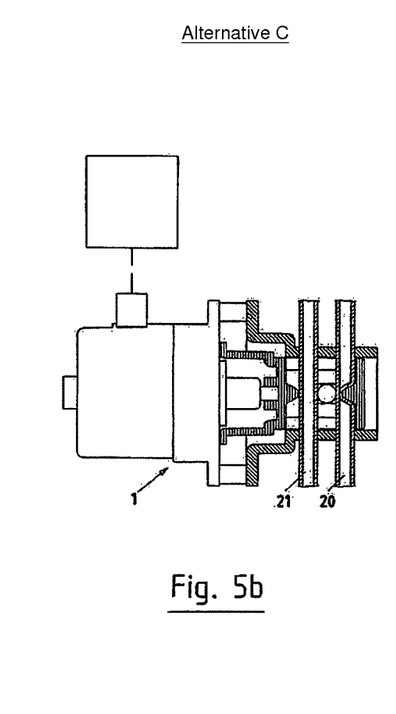
Figure 5C:
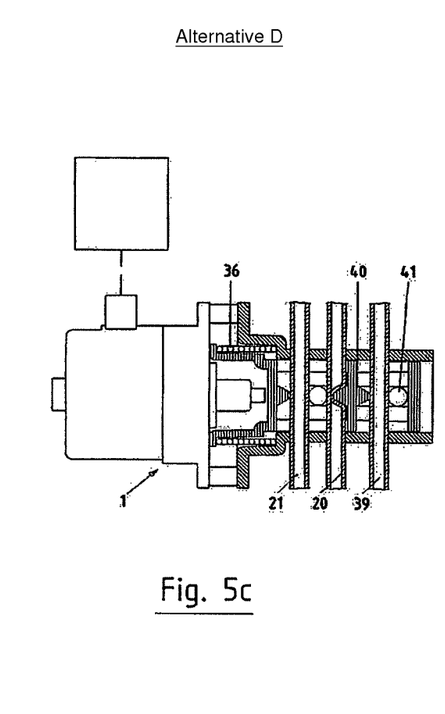

Finally, FIGS. 5a-c show yet different further possible constructional alternatives of a pinch valve of the basic design A according to FIG. 4, wherein FIG. 5a) is a constructional alternative B comprising a pressure spring and independent fluid passage lines, FIG. 5b) is a constructional alternative C without a pressure spring and FIG. 5c) is a constructional alternative D comprising a pressure spring and a plurality of fluid passage lines.

In the basic design A according to FIG. 4, the distribution connection 37 can be arranged at the inlet or outlet side.

In the design according to FIG. 5a (alternative B), the fluid passage lines 20, 21 are guided independently. There is still a coupling of the locking functions in the two fluid passage lines (the locking or opening functions, respectively, take place simultaneously, however, a path change-over does not take place).

In the design according to FIG. 5b (alternative C), the pinch valve 1 is operated without the pressure spring 36. For this purpose, the lifting rod 35 is fixedly connected to the valve change-over switch 22. Due to the fact that there are stepper motor drives, which can be held in a dead state in each position, this constructional alternative, which consists of fewer individual components, can oftentimes be considered.

However, the prestress raised by means of the pressure spring can be used to attain initial mechanical states with designs comprising pressure springs.

In the design according to FIG. 5c (alternative D), the pinch valve 1 encompasses a plurality of fluid passage lines and can be expanded modularly. In addition to the present two fluid passage lines 20, 21, this example encompasses a further fluid passage line 39 as well as further pinch wedge 40 and a further intermediate bolt 41. Two "closing passages" and one "opening passage" are thus present herein (provided that one acts on the assumption of the illustrated rest state). It goes without saying that any further switch-over combinations can be realized due to the modular expandability.

That which is claimed:

1. A beverage preparation machine comprising at least one pinch valve in the fluid line system, wherein the pinch valve encompasses at least two fluid passage lines and is designed to execute at least one of valve and control functions on the at least two fluid passage lines, wherein the pinch valve encompasses a linear activating mechanism of the at least one of valve and control functions of the fluid passage lines, which is adapted for a coupled activation of the at least two fluid passage lines,     wherein the pinch valve comprises a valve housing in which the fluid passage lines are located and an intermediate bolt being arranged in the valve housing between the at least two fluid passage lines,     wherein the linear activating mechanism comprises:

a valve change-over switch being linearly moveable in the valve housing in an axial direction so that the valve change-over switch is displaced with respect to each one of the fluid passage lines,     two pinch wedges being attached to the valve change-over switch and being arranged on opposite sides of the intermediate bolt so that one of the at least two fluid passage lines is arranged between the intermediate bolt so that one of the two pinch wedges and the other one of the at least two fluid passage lines is arranged between the intermediate bold and the other one of the two pinch wedges, and     a stepper motor having a lifting rod and being arranged at the valve housing so that the lifting rod, by an activation of the stepper motor, is linearly displaceable in the axial direction, in which the valve change-over switch is moveable,     wherein a pressure spring is arranged for pressing the valve change-over switch in the axial direction against the lifting rod and     the lifting rod is configured to transfer a displacement of the lifting rod in the axial direction on the valve change-over switch, thus enabling a displacement of the two pinch wedges with respect to the intermediate bolt so that each one of the at least two fluid passage lines are either opened or pinched between the intermediate bolt and one of the two pinch wedges,     wherein the stepper motor is configured to move the change-over switch into at least one of a first switch-over position, a second switch-over position, and a central position between the first switch-over position and the second switch-over position,     wherein, when the change-over switch is in the first switch-over position, one of the at least two fluid passage lines is closed by one of the two pinch wedges and the other one of the at least two fluid passage lines is open,     when the change-over switch is in the second switch-over position, the other one of the at least two fluid passage lines is closed by means of the other one of the two pinch wedges and the one of the at least two fluid passage lines is open, and     when the change-over switch is in the central position, none of the at least two fluid passage lines is completely blocked by any one of the two pinch wedges, and     wherein the change-over switch is configured to be maintained in the central position via the stepper motor and the stepper motor is a self-locking stepper motor being configured to be held in a dead state when the change-over switch is in one of the central position, the first switch-over position, or the second-switch over position.

2. The beverage preparation machine according to patent claim 1, wherein the coupled activation of the at least one of valve and control function has a change-over function or at least a throttling function in opposite directions.

3. The beverage preparation machine according to claim 1, wherein each of the at least one fluid lines is configured as a pinchable valve tube.

* * * * *

UNITED STATES PATENT AND TRADEMARK OFFICE
CERTIFICATE OF CORRECTION

| | | |
|---|---|---|
| PATENT NO. | : 8,839,711 B2 | Page 1 of 1 |
| APPLICATION NO. | : 12/517510 | |
| DATED | : September 23, 2014 | |
| INVENTOR(S) | : Reyhanloo | |

It is certified that error appears in the above-identified patent and that said Letters Patent is hereby corrected as shown below:

In the claims:

Column 5,
Line 36, "so that" should read --and--;
Line 39, "intermediate bold" should read --intermediate bolt--.

Column 6,
Line 37, cancel "patent".

Signed and Sealed this
Twenty-first Day of April, 2015

Michelle K. Lee
*Director of the United States Patent and Trademark Office*